Figure 1:
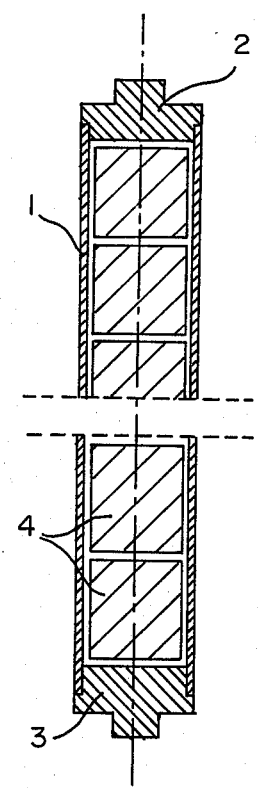

United States Patent [19]
Lysell

[11] 3,926,721
[45] Dec. 16, 1975

[54] METHOD OF OPERATING A WATER-COOLED NUCLEAR REACTOR

[75] Inventor: Gunnar Lysell, Nykoping, Sweden

[73] Assignee: Aktiebolaget Atomenergi, Stockholm, Sweden

[22] Filed: June 15, 1973

[21] Appl. No.: 370,206

[30] Foreign Application Priority Data
June 29, 1972 Sweden.............................. 8579/72

[52] U.S. Cl.............. 176/19 R; 176/38; 176/91 R; 176/DIG. 1
[51] Int. Cl. .... G21b 3/06; G21b 7/00; G21b 17/00
[58] Field of Search ........ 176/10, 11, 12, 19 R, 27, 176/28, 38, 39, 67, 91 R, DIG. 1

[56] References Cited
UNITED STATES PATENTS 3,384,551   5/1968   Kornbichler.......................... 176/67
3,466,225   9/1969   MacPhee .............................. 176/67

OTHER PUBLICATIONS

M. A. Schultz, Control of Nuclear Reactors and Power Plants, McGraw–Hill, 1955, pp. 20–21, 87, 169, 234–235.

Primary Examiner—Stephen C. Bentley
Attorney, Agent, or Firm—Toren, McGeady and Stanger

[57] ABSTRACT

When operating a water-cooled nuclear reactor, in which the fuel rods consist of zirconium alloy tubes containing an oxidic nuclear fuel, stress corrosion in the tubes can be reduced or avoided if the power of the reactor is temporarily increased so much that the thermal expansion of the nuclear fuel produces a flow of the material in the tube. After that temporary power increase the power output is reduced to the normal power.

3 Claims, 3 Drawing Figures

METHOD OF OPERATING A WATER-COOLED NUCLEAR REACTOR

The present invention relates to a method of operating a water-cooled nuclear reactor comprising fuel rods of the type containing an oxidic nuclear fuel surrounded by a covering of a zirconium alloy. By water-cooled nuclear reactor is meant a nuclear reactor in which the fuel rods are cooled by heavy or light water. The nuclear reactor may be of the boiling water or pressurized water type. The oxidic nuclear fuel is generally $UO_2$ in the form of sintered pellets. These are arranged in a tubular covering of a zirconium alloy, normally the alloy known as Zircaloy.

During operation of a nuclear reactor of this type it has been found that the covering has a tendency to rupture a short while after the power in the fuel rod has been increased. This may be an increase in power in all the fuel rods of the reactor, or in one group of fuel rods. The power increase may be an increase from one power to a higher power, or, after shut-down of the reactor, from zero power to the desired power.

This risk of rupture in the covering is particularly noticeable with fuel rods which are partially burned out, for example fuel rods from which more than 2000 MWd has been extracted per ton of fuel. This indicates that the rupture of the covering is caused by stress corrosion due to fission products produced, such as iodine, which can reach the covering through cracks in the sintered fuel pellets. Characteristic of this type of stress corrosion is that it occurs when a certain stress level in the covering material has been exceeded. This level is approximately 30 kg/mm² for the alloy in question, see Garlick & Wolfenden, Fracture of Zirconium Alloys in Iodine Vapour, Journal of Nuclear Materials 41 (1971), page 285.

According to the invention it has been found that it is possible to essentially reduce the risk of this type of fracture of the covering by briefly increasing the power so much above the desired power that the thermal expansion caused by the increased temperature in the nuclear fuel causes a flow of the material in the covering, after which the power is reduced to that desired. The thermal expansion produces such a pressure on the covering from the inside that the yield limit of the material in the covering is exceeded. When the power output is then reduced to normal, not only are the stress peaks evened out, but all stresses caused by the temperature are reduced below the critical level. It is thus ensured that there are no stress peaks and the stress everywhere is sufficiently low for stress corrosion to be eliminated. It is an additional advantage of the invention that the increase in power of a nuclear reactor can take place rapidly. The temporary over-power should preferably take place while the power output of the reactor is being changed from a lower, constant, level to a higher, constant, level. It may, however, be useful to insert a temporary over-power also while the reactor is being permanently operated at a constant power level.

It is advisable to briefly increase the power to a power which is 20 – 200, preferably 75 – 100 W per cm of rod length, above the desired power. It is also advisable to maintain the increased power so long that the temperature of the centre of the nuclear fuel is 10° – 100°C below the equilibrium temperature at this increased power, preferably 35° – 45°C below the equilibrium temperature. The increase in power should take place rapidly and no slower than 0.2 W per cm of rod length and second. The methods of controlling the power output of a nuclear reactor are well known. The usual method is to use control rods which contain an element that absorbs neutrons, such as boron. The control rods can be inserted into the reactor hearth to any desired depth. Other methods for controlling the power output are also useful in combination with this invention.

Figure 2:
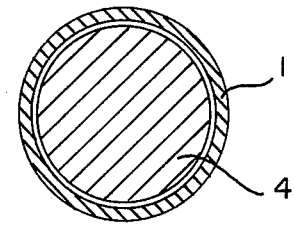
Figure 3:
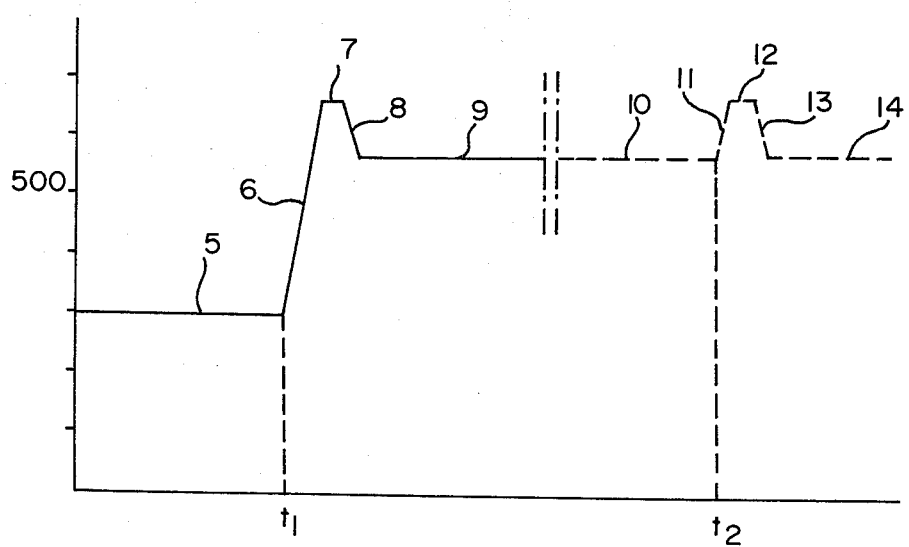

The invention will now be described with reference to the accompanying drawing. FIGS. 1 and 2 illustrate sections of a fuel rod which may be used in a reactor to be operated according to the invention. FIG. 3 illustrates the invention by means of a diagram.

The fuel rod according to FIGS. 1 and 2 consists of a tubular covering 1 of a zirconium alloy, end plugs 2, 3, and cylindrical nuclear fuel pellets 4. For the sake of clarity FIGS. 1 and 2 show an exaggerated clearance between the fuel pellets 4 and the tube 1. In fact, we prefer to manufacture the tube and the pellets with a clearance of only 0.2 – 0.4 mm, perferably 0.3 mm, between the tube and the pellets. This clearance permits the pellets to be easily inserted in the tube, and the heat transfer from the pellets to the tube is satisfactory. After a short time of operation the pellets have expanded so as to be in close contact with the tube. A plurality of such fuel rods are assembled to form a fuel cartridge, and a plurality of such cartridges form the hearth of a nuclear reactor. The fuel cartridge and the nuclear reactor do not form part of the invention, and are not to be described here. When the nuclear fuel pellets 4 are heated during the operation of the reactor according to the invention they expand so as to expose the tube 1 to a pressure from the inside. The temporarily increased power creates such a high pressure inside the tube 1 that the yield limit of the zirconium alloy is exceeded, producing a flow of the alloy, thus reducing the risk for stress corrosion.

In the diagram of FIG. 3 the abscissa represents the time and the ordinate power output defined as watt per cm of fuel rod length. The diagram relates to a light water reactor fuelled with enriched uranium oxide, $UO_2$. The fuel rods have an external diameter of 13.5 mm and the covering of Zircaloy has a wall thickness of 0.70 mm.

The unbroken line of the diagram illustrates that the reactor is first operated at a power of 300 W per cm of rod length, vide line 5, and a water temperature of 285°C until the time $t_1$ in the diagram. The burn-up is then 19,000 MWd per ton of fuel. It is now desired to increase the power output of the reactor, by means of the control rods, to correspond to a power output of 550 W per cm of fuel rod length. This is done by increasing the power to 650 W/cm over a period of 90 seconds, vide line 6, maintaining this power for 15 seconds, vide line 7, rapidly reducing the power to 550 W/cm, vide line 8, and continuing to operate the reactor at this power, vide line 9. During the brief over-power period the temperature at the centre of the fuel pellets has time to reach substantially the equilibrium temperature. During continued operation of the reactor it has been found that the risk of stress corrosion has considerably decreased in comparison with the same power increase without the brief period of over-power.

The diagram of FIG. 3 also illustrates, vide the broken line, that the invention can be utilized also when no permanent power increase is desired. The nuclear reactor is operated at a fuel rod power output of 550 W/cm. At the time $t_2$ the power is rapidly increased to 650 W/cm, vide line 11. This power is maintained for 15 seconds, vide line 12. The power is now rapidly reduced to the normal power of 550 W/cm, vide line 13, and the operation of the reactor is now continued at this normal power, vide line 14.

What is claimed is:

1. In a water-cooled nuclear reactor comprising fuel rods of the type containing oxidic nuclear fuel enclosed by a covering of a zirconium alloy, the method of operating the reactor so that the stress corrosion caused in the covering at least in part by the production of fission products is avoided, comprising the steps of operating the nuclear reactor at a desired power output, rapidly increasing the power output of the reactor at a rate not less than 0.2 W per cm of fuel rod length and per second to a power output in the range of 20 – 200 W per cm of fuel rod length above the desired power output, maintaining the increased power output for a period of time so that the temperature at the center of the fuel rods is in the range of 10° to 100° C. below the equilibrium temperature at the increased power output, and returning the reactor to the desired power output so that during the period of the increased power output the thermal expansion caused by the increased temperature in the nuclear fuel produces a pressure on the interior of the covering which exceeds the yield limit of the zirconium alloy covering whereby the stress peaks are evened out and all temperature stresses are reduced below the critical level.

2. The method of operating the reactor, as set forth in claim 1, comprising the further step of raising the desired power output to a higher desired power output by increasing the power output to a level above the higher desired power output to stress relieve the covering before reducing the power output to the higher desired power output.

3. The method of operating the reactor, as set forth in claim 1, wherein the step of rapidly increasing the power output is carried out to a power output in the range of 75 – 100W per cm of fuel rod length above the desired power output and the step of maintaining the increased power output for a period of time is carried out so that the temperature at the center of the fuel rods is in the range of 35° – 45° C. below the equilibrium temperature at the increased power output.

* * * * *